June 5, 1923.
M. SEED
DEMOUNTABLE RIM
Filed Aug. 1, 1922
1,458,007
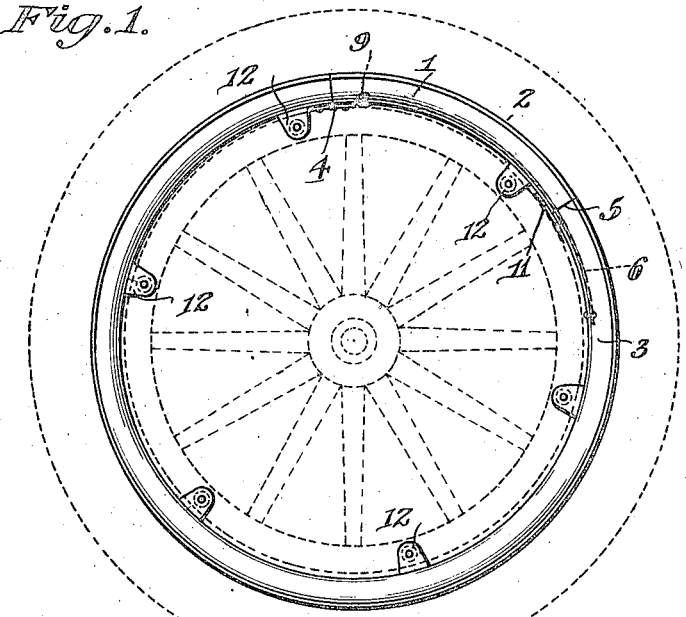
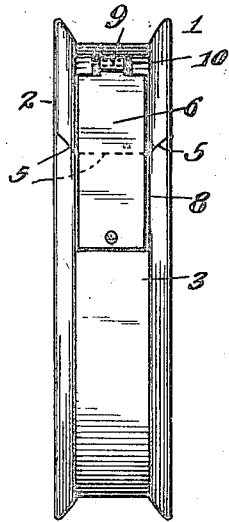
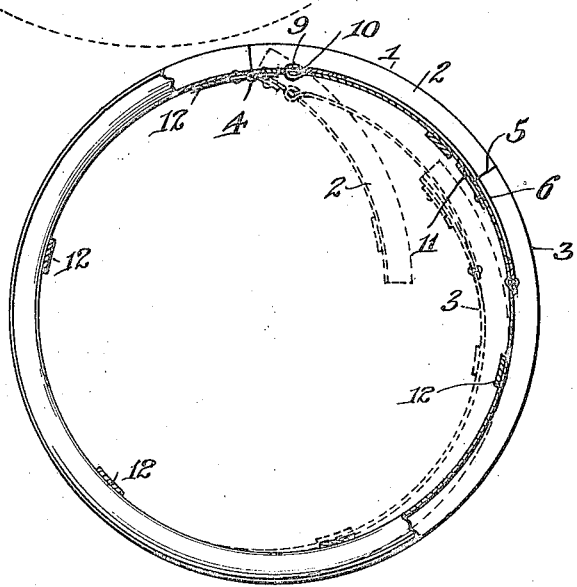
Mack Seed, INVENTOR.
BY Geo. F. Kimmel, ATTORNEY.

Patented June 5, 1923.

1,458,007

UNITED STATES PATENT OFFICE.

MACK SEED, OF BILLETT, ILLINOIS.

DEMOUNTABLE RIM.

Application filed August 1, 1922. Serial No. 578,957.

*To all whom it may concern:*

Be it known that I, MACK SEED, a citizen of the United States, residing at Billett, in the county of Lawrence, and State of Illinois, have invented certain new and useful Improvements in Demountable Rims, of which the following is a specification.

This invention has reference to demountable automobile rims, and its object is to provide a rim which may be readily collapsed when removed from the wheel to effectively shorten the length of the rim and thus permit the tire to be removed from the rim without the necessity of prying the tire from the rim, and to permit the tire to be readily replaced without the aid of tools.

In accordance with the invention, the rim is formed of two sections, hinged together at one end and connected by a spring element at the other end, so that the rim may be collapsed, because of the spring section to effectively shorten the circumferential extent of the rim, thus permitting the ready removal of the tire when so desired.

The expanding of the rim is facilitated by the presence of a spring enlarging the rim to the original extent and when the tire is in place, the rim becomes locked and is held against further collapse by the felly of the wheel.

The collapse of the rim is readily effected by a blow imparted at a point constituting a break in the continuity of the rim, which act of breaking the continuity of the rim is facilitated by the presence of the spring.

The invention will be best understood from a consideration of the following detailed description, taken in connection with the accompanying drawings forming part of this specification, with the understanding that the invention is not confined to any strict conformity to the showing of the drawings, but may be changed and modified, so long as such changes and modifications mark no material departure from the salient features of the invention, as expressed in the appended claims.

In the drawings,

Figure 1 is a face view of the expanded rim with a wheel body shown in dotted lines and within the rim, and the tire indicated in dotted lines exterior to the rim, Fig. 2 is an edge view of the rim with the tire omitted, Fig. 3 is a side view of the rim with parts in circumferential section and the rim shown in the broken position in dotted lines.

Referring to the drawings, there is shown a rim 1, formed of a section 2 and a body portion 3, which together constitute the rim.

The rim section 2 constitutes a minor portion of the circumferential extent of the rim and at one end is provided with a hinge 4, connecting the two rim sections together, so that the continuity of the rim may be broken at the hinge 4.

The rim section 2 at the end remote from the hinge 4 simply abuts with the adjacent end of the rim 1, as indicated at 5, but is not directly connected thereto.

The portion 3 of the rim is connected to the body of the rim adjacent to the hinge 4 by an elongated spring 6 connected at one end to the body of the rim by the hinge 4 and at the other end beyond the junction or abutting portion 5, by rivets 7, or in other appropriate manner, so that the junction portion 5 is intermediate of the hinge 4 and rivet connections 7.

The spring 6 is so disposed that when the rim is in position, the spring 6 lies in an elongated recess 8 along the inner face of the rim, serving to connect the two portions of the rim together, thus permitting the rim to be collapsed by a blow directed against the rim at the meeting portion 5, the collapsing being toward the axis of the wheel.

By sinking the spring partially into the outer surface of the rim, such spring is partially countersunk where it goes around the rim, so as to leave the outer surface of the rim smooth, the countersunk portion being approximately equal to other depressions on the rim, whereby other inequalities on the inner side of the rim are equal to the lug affairs which hold the rim a short distance from the wheel.

One end of the spring 6 is formed into an eye 9, encircling a pintle 10, which may be in one piece with the rim, so that the corresponding end of the spring may rock about the pintle 10.

The eye end of the spring 6 and the pintle 10 coact to provide an easily broken hinge, so that the continuity of the parts may be broken by a hammer blow delivered adjacent to the hinge, thus causing the hinge section 2 of the rim to readily collapse, after which the section 2 may be folded back upon the main part of the rim remote from the hinge, the unbroken part of the rim bending at a point some distance from the hinge and can be folded back upon the unbroken portion to reduce the diameter of the rim, thus correspondingly reducing the circumferential extent of the rim and permitting the easy placing of the tire upon the rim. After this is accomplished by the rocking of the hinge end of the spring about the pintle 10 and the tire is placed upon the rim, the hinged portion of the tire may be restored to its original position, filling out the rim and permitting the inflation of the tire.

At the abutting ends 5 of the rim, there is provided a latch 11, whereby accidental collapse of the rim after the tire is in place is prevented. Such latch permits the positive junction of the parts of the rim where abutting at the division or split 5 and avoids any accidental collapse of the rim when in use.

The rim 1 is provided at spaced, preferably equi-spaced, intervals about its circumference, with attaching lugs 12, which may be of ordinary construction and therefore require no special description.

The parts are so proportioned that the spring 6 being partially countersunk into the outer face of the rim occupies but a minimum amount of depth and therefore in no way interferes with the tire casing.

When it is desired to either remove or replace a tire, the inner tube is deflated, or perhaps, has been accidentally deflated, and then the hinged section 2 is moved toward the axis of the wheel about the hinge 9 or hinge pintle 10, swinging the section 2 away from the main body of the rim, so as to fold against such main body, after which the tire to be replaced, may be removed and a new or uninjured tire may be substituted therefor. Following this, the inner tube in the new casing or repaired casing may be inflated for the collapsed condition of the rim, permits the ready placing of an uninjured or repaired casing and inner tube upon the rim for subsequent inflation, and the latch 11, being properly engaged, the casing is constrained to maintain its proper position during reinflation.

What is claimed is:—

1. A demountable rim having a circumferentially incomplete section hinged at one end to the adjacent end of the rim, a latch on the other end of the rim for connecting the latter to the hinged section, and a spring connected to the second named portion of the rim at the end remote from the hinge and resisting displacement of the incomplete section from circumferential continuity with the rim.

2. A demountable rim having a circumferentially incomplete section hinged at one end to the adjacent end of the rim, a spring countersunk into the hinge and adjacent portions of the rim and having a hinge connection with the rim, and a latch for connecting the countersunk portion and the main portion of the rim.

3. A demountable rim having a circumferentially incomplete section provided with a hinge connection between the main and incomplete sections of the rim, said incomplete sections breaking toward the axis of the wheel, a spring hingedly engaging the incomplete section adjacent to the hinge, and a latch for connecting the main portion of the rim to the hinged section.

In testimony whereof, I affix my signature hereto.

MACK SEED.